United States Patent [19]
Billman

[11] 3,744,512
[45] July 10, 1973

[54] VALVE APPARATUS
[76] Inventor: Roger O. Billman, 104 Warren St., Martinez, Calif. 94553
[22] Filed: July 2, 1970
[21] Appl. No.: 52,008

[52] U.S. Cl.............. 137/238, 137/312, 137/340, 137/625.19
[51] Int. Cl..... F16k 5/04, F16k 49/00, F16k 51/00
[58] Field of Search.................. 251/317; 137/237, 137/238, 240, 312, 340, 625.19, 625.47; 251/309, 312, 314, 316, 317

[56] References Cited
UNITED STATES PATENTS

| | | | |
|---|---|---|---|
| 540,245 | 6/1895 | Greene | 251/312 |
| 2,310,583 | 2/1943 | Johnson | 251/317 |
| 1,535,212 | 4/1925 | Egloff et al. | 137/240 |
| 3,098,506 | 7/1963 | Spragens | 251/317 X |
| 2,099,443 | 11/1937 | Kraft | 137/240 |
| 2,315,058 | 3/1943 | Holt et al. | 137/240 X |

FOREIGN PATENTS OR APPLICATIONS

| | | | |
|---|---|---|---|
| 1,109,781 | 9/1955 | France | 251/317 |
| 520,402 | 3/1955 | Italy | 251/317 |

Primary Examiner—Martin P. Schwadron
Assistant Examiner—Richard Gerard
Attorney—Edward J. Keeling

[57] ABSTRACT

A valve useful over a wide temperature range and having a purge system which prevents leaks from the valve and a valve stem especially useful with a valve having such a purge system which valve stem has easily replaceable sleeves having porous support means in the openings thereof for use in the operational portion of the valve body to control flow therethrough.

10 Claims, 6 Drawing Figures

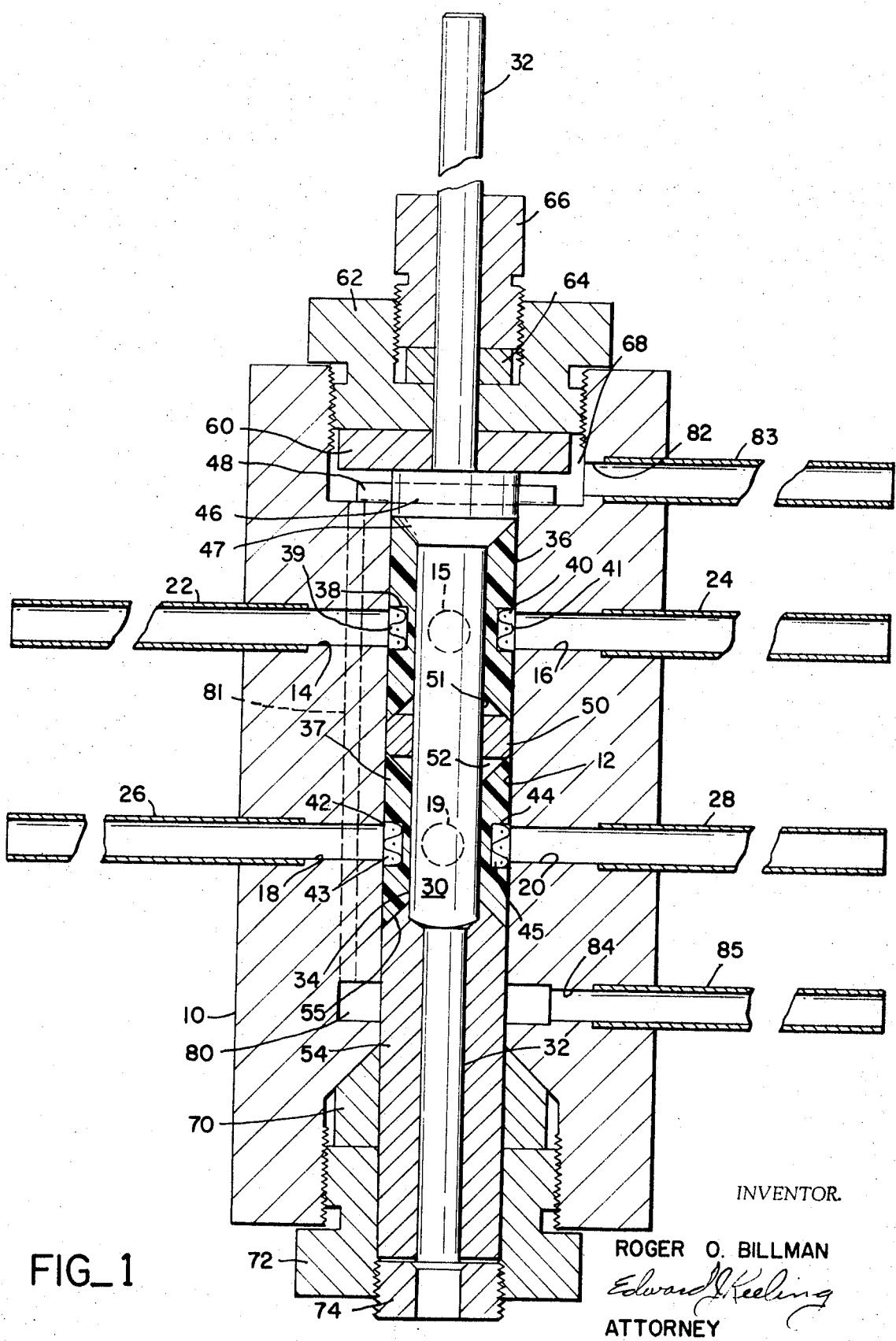
FIG_1

PATENTED JUL 10 1973 3,744,512
SHEET 2 OF 2
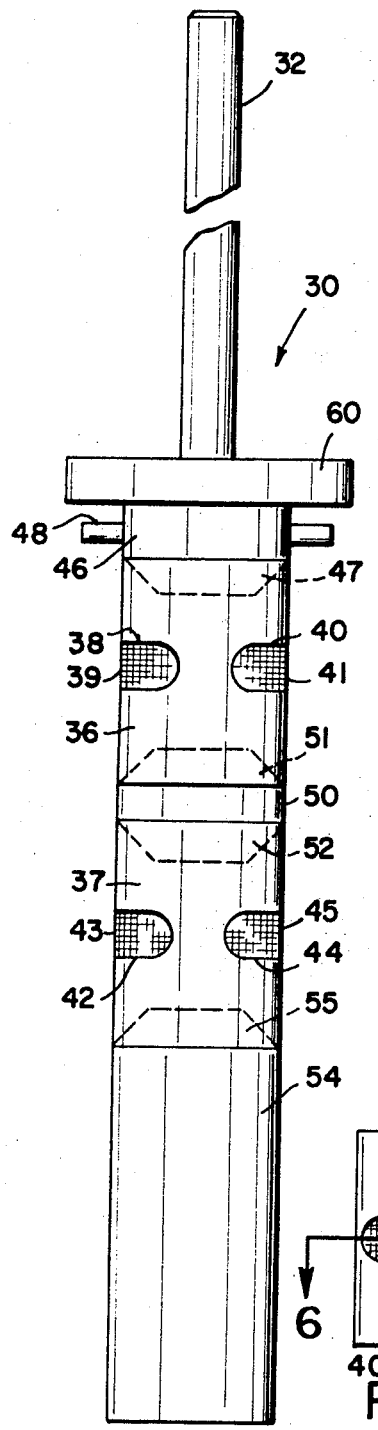
FIG_4
FIG_5
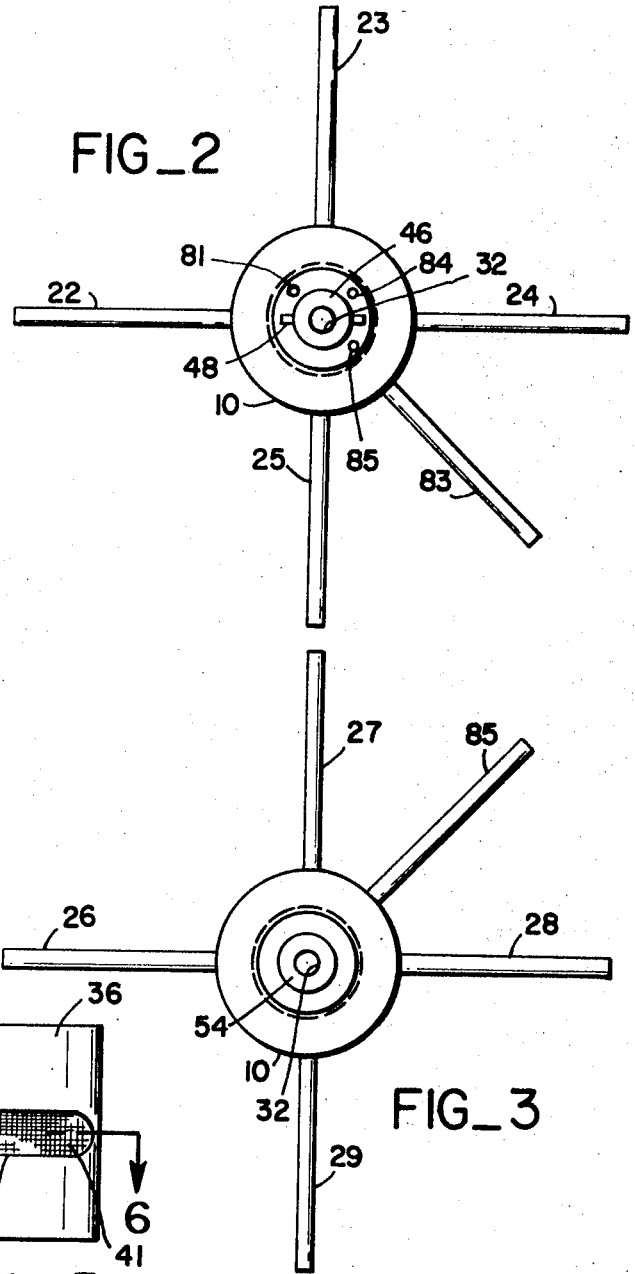
FIG_2
FIG_3
FIG_6
INVENTOR.
ROGER O. BILLMAN
Edward J. Keeling
ATTORNEY

VALVE APPARATUS

BACKGROUND OF THE INVENTION

The invention relates to a valve including a valve stem for use in controlling fluid streams such as in sampling and analysis operations at elevated conditions of temperature and pressure. More particularly the invention relates to a valve having a purge system associated therewith and a valve stem having replaceable sleeve members for use with such a valve.

The present invention is useful in a variety of operations and in many different modes of apparatus. For example the valve of the present invention may be used as a four way valve in a storage loop in which fluid is trapped for later sampling. It is also useful as a four way valve in switching gas or liquid streams. Multiple components of the present invention may be assembled to provide an eight way valve for example, useful in backflushing and sampling. Other configurations and uses will be readily apparent from the description.

Heretofore other sampling and injection valves have been disclosed and used in many applications. There is still need however for a sampling and injection valve which is relatively inexpensive and easy to maintain and which may be utilized in high temperature-high pressure applications. There is also need for a valve which permits the use of replacable valve stems without danger of fluid system leakage from the valve which may be undesirable or dangerous depending on the particular fluid used in the fluid system. The present invention provides such a valve and valve stem.

SUMMARY OF THE INVENTION

The present invention is directed to a valve and a valve stem for use in controlling gas or liquid steams. The apparatus of the present invention is useful, for example, in chromatographic operations, in switching gas and liquid streams and in sampling operations. A particular feature of the valve of the present invention is the incorporation of a purge system in the valve body which provides a purge fluid to prevent fluid leakage from the valve should a leak occur. Thus the valve body is provided with a purge system adjacent the valve stem - valve body interface so that any leakage at this interface is carried from the valve with the purge fluid and will not leak uncontrollably from the valve.

The valve is adapted to control fluid streams and may in accordance with the invention, be arranged to control a variety of systems as for example a simple on-off embodiment to a plurality of flow control positions requiring a multiplicity of a flow path through the valve body and a sophisticated valve stem.

The valve stem of the present invention utilizes easily replaceable sleeves which have openings to selectively open and close flow passages in a valve. Thus one or more deformable sleeves of the valve stem are located adjacent the flow passages of the valve body and by suitable manipulation of the valve stem the flow passages of the valve body are selectively opened and closed. The openings in the deformable sleeves are provided with support means to prevent undesirable deformation of the sleeve which might tend to close of the openings particularly under higher pressure and temperature conditions.

In combination the valve body and the valve stem of the present invention provide a safe, efficient and readily replaceable valve for use in a variety of operations under elevated conditions of temperature and pressure. Thus the replaceable deformable sleeves of the valve stem can be utilized while the hazard of leakage is eliminated by the purge system of the valve. When because of wear it is necessary to replace the sleeves such replacement is readily accomplished by removing the valve stem from the valve body and removing the used sleeve from the valve stem and replacing it with the new sleeve. The valve stem and new sleeve are then reinserted into the valve body. This is accomplished without removing the valve body from its connections. In addition the purge system of the present invention provides a temperature control function with the valve body. This function, in addition to other advantages, permits use of the deformable sleeves with higher temperature fluid streams than would otherwise be possible.

BRIEF DESCRIPTION OF THE INVENTION

The valve of the present invention includes a valve body having a central opening formed therein and sample flow passages located between the central opening and the outside or inflow portion of the valve body. A valve stem is positioned in the central opening of the valve body for selectively opening and closing the sample flow passages. A first chamber is formed adjacent the central opening of the valve body and the valve stem above (or below) the sample flow passages. The first chamber is formed by the valve body and first cap means which cooperate with the valve stem to close off one end of the central opening. A second chamber is formed in the valve below (or above) the sample flow passages and is also adjacent the valve stem and the valve body. Purge flow passage ways communicate with each of the chambers and the chambers are connected together by a connecting passageway formed in the valve body. Thus when purge fluid is injected into the first chamber it will flow through the connecting passage way into the second chamber and then out of the valve body through the purge flow passage communicating with such chamber. If a leak occurs at the valve body - valve stem interface the leaking fluid is removed from the valve with the purge fluid.

The valve stem of the present invention comprises an elongated member having a portion adapted to be received in an opening of a valve body. A sleeve member is removably fitted in position over this portion of the elongated member. The sleeve member has opening formed therein to selectively open and close passageways communicating with the opening of the valve body. Locking means disconnectably connect the sleeve member in position on the elongated member. Support means are located in the openings of the sleeve member to prevent undesirable deformation of the sleeve member which might otherwise hinder operation of the valve.

OBJECTS OF THE INVENTION

The primary object of the present invention is the provision of a valve having a purge system which prevents leaks from the valve and a valve stem especially useful with a valve having such a purge system which valve stem includes easily replaceable sleeves for use in the operational portion of the valve body to control flow therethrough. Further objects and advantages of the present invention will become apparant from the

BRIEF DESCRIPTION OF THE DRAWINGS

FIG. 1 is an elevation view partically in section and illustrates the preferred embodiment of apparatus assembled in accordance with the present invention;

FIG. 2 is a top plan view of FIG. 1 in reduced size with some parts removed for clarity of presentation;

FIG. 3 is a bottom plan view of FIG. 1 in reduced size and with some parts removed for clarity of presentation;

FIG. 4 is an elevation view of the prefered valve stem assembled in accordance with the present invention;

FIG. 5 is an elevation view of deformable sleeve member useful in the valve stem assembly of FIG. 4;

FIG. 6 is a sectional view taken at line 6—6 of FIG. 5.

DETAILED DESCRIPTION OF THE PREFERRED EMBODIMENT

The preferred embodiment of apparatus assembled in accordance with the present invention is shown in FIG. 1 in elevation view which is partially in section for clarity of presentation. The valve of the present invention includes a valve body 10 having a central opening 12 formed therein. The central opening 12 is preferably formed along the longitudinal centerline of the vlave body 10. The valve body 10 has a plurality of sample flow passages communicating with the central opening 12. For example flow passages 14, 15, 16, and 18, 19, 20, may be formed in the valve body in accordance with the invention. Although not shown in FIG. 1, sample flow passages are formed in front portion of the valve which is removed in the sectional view. This is illustrated in FIG. 2 and 3. Sample flow tubes 22 – 29 are connected into the sample flow passageways. These tubes cooperated with the flow passageways to provide communication between the outside of the valve and the central opening thereof.

Many uses and modes of operation of the valve of the present invention will be readily apparant. For example the valve is useful with only one sleeve member as a four way valve used to store fluid stream for later sampling. The valve is also useful as a four way valve in switching gas or liquid streams. The preferred embodiment as described herein is an eight way valve and is useful in backflushing and sampling. Obviously other uses and applications of the present invention will be apparant from this description.

A valve stem generally indicated by the number 30 is positioned within the central opening 12 of the valve body of the present invention and generally comprises an elongated shaft 32 having at least a portion formed in square cross-section as indicated by the number 34. The square portion 34 of the valve shaft 32 is adapted to be received in the central opening 12 valve body 10 adjacent the sample flow passageways 14, 15, 16, 18, 19, and 20. A sleeve member 36 having a square hole is removably fitted in position over the square portion 34 of the valve shaft 32. In the eight-way valve illustrated in FIG. 1 a second sleeve member 37 is also removably fitted over this portion of the valve shaft 32. The sleeve members 34, 36 are made of a resiliant, deformable material such as Teflon. The sleeve members 34, 36, have openings 38, 40, 42, 44 formed therein for selectively opening and closing the sample flow passageways communicating with the central opening 12 of the valve body 10. Supporting porous members such as screens 39, 41, 43, and 45 are positioned in these openings to prevent undesirable deformation of the sleeve members at high temperature. The deformable sleeves 36, 37, are removably connected on the rectangular portion 34 of the valve shaft 32 by suitable locking means. For example an upper collar 46 is fitted over the valve shaft 32 and held in position by a suitable pin 48. The upper collar 46 has a tapered portion 47 adapted to cooperate with tapered portion of deformable sleeve member 36 to provide a close fit between these elements. A spacer collar 50 also having suitable tapered edges is removably fitted on the rectangular portion 34 of the valve shaft 32 between the sleeve members 36, 37. A lower locking collar 54 is removably fitted over the lower portion of the valve shaft 32. The tapered portion 55 of the lower collar 54 fits into the cooperating portion of the sleeve member 37.

The above described valve stem assembly 30 is removably positioned in the central opening 12 of the valve body 10. The valve stem 30 is rotatable when in position in the central opening. Thus by rotating the valve stem the various flow passageways in the valve body and communicating with the central opening may be selectively opened and closed. Thus when the openings 38, 40, 42, 44 of the sleeve members 36, 37 are formed in accordance with the preferred embodiment of the invention a 90° rotation of the valve stem 30 will selectively open or close flow through adjacent flow passageways. In the preferred embodiment pin 48 in valve stem 32 cooperates wijh limit pins 84 and 85 (FIG. 2) to permit 90° rotation of the valve stem. Thus in one position as for example when pin 48 is rotated against limit pin 84 flow in the upper portion of the valve occurs through sample flow tubes 22 and 23 and not through tubes 24 and 25. In the lower portion of the valve when pin 48 is in this position flow occurs through tubes 26 and 27 and not through tubes 28 and 29. When the valve stem is rotated 90° and pin 48 contacts limit pin 85 the opposite flow tubes are opened and closed respectively.

The valve stem 30 is maintained in the central opening 12 of the valve body 10 by suitable cap means. For example an upper or first cap means includes a washer member 60 adapted to fit on the valve shaft 32 adjacent collar 46. An upper locking collar 62 having exterior threads mating with cooperating interior threads on the valve body fits above member 60 and holds the valve stem assembly in the valve body. The upper locking collar 62 has a central opening through which the shaft 32 of the valve stem 30 passes. To insure against gas leakage along the valve shaft an upper packing ring 64 and lock nut 66 may also be connected to the locking collar 62. As is evident the above described first cap means cooperates with the valve stem assembly to close off the upper end of the central opening 12 of the valve body 10. Further the first cap means and the valve body cooperate to form a first chamber 68 adjacent the valve stem and the central opening of the valve body above the sample flow passageways.

The lower portion of the valve stem 30 is maintained in the valve body 10 by suitable means. In accordance with the preferred embodiment of the invention lower cap means adjustably secure the valve stem in position within the central opening 12 of the valve body 10. Thus a lower packing ring 70 and a lower locking collar 72 are connected by suitable threads with the valve body 10. A lower locking nut 74 threadly engages in the locking collar 72 and abuts against the end of valve stem sleeve 54. When the locking collar 72 is moved against packing ring 70 a seal is made against the valve stem sleeve 54 to prevent fluid bypass of the sleeve. The locking collar is screwed into the lower portion of the valve body and exerts pressure on packing ring 70 to make a seal against the valve stem sleeve 54. The locking nut is movable to adjust the pressure placed on the deformable sleeve members 36, 37. This is a desirable feature of the present invention especially when the valve is used for high pressure or temperature applications where more pressure must be placed on the deformable sleeves to prevent leakage in the valve.

A lower or second chamber 80 is also formed in the valve body 10 adjacent the valve stem 30 and the central opening 12 of the valve body 10 below the sample flow passages 42, 44. A longitudinal passageway 81 connects the first 68 and the second 80 chambers. A first purge flow passageway 82 having a suitable tube 83 connected thereto provides communication between the first chamber and a source of purge fluid (not shown) outside of the valve body 12. A second purge flow passageway 84 having a suitable tube 85 connected therein provides communication between the second chamber and a sump for the purge fluid. In accordance with the invention the purge fluid may comprise any suitable inert fluid. The inert fluid may be liuqid or gas depending on the particular operation in which the vlave is functioning. Suitable purge fluids include for example water, inert oil, nitrogen and helium. Thus the valve of the present invention includes a fluid purge system which is utilized to insure that, if a leak occurs between the valve stem and the vlve body, no leakage will escape from the valve but rather will be carried away with the purge fluid. The longitudinal purge flow passageway 81 is formed in the valve body opposite the purge flow openings 82, 84 to insure that the purge fluid will completly sweep the first and second chambers of any leakage between the valve stem and valve body.

In addition to or in connection with the purge system as described above the apparatus of the present invention may also be utilized in temperature sensative operations. Thus if it is desired to cool or heat the interior of the valve body or to maintain it at a given temperature the temperature of the purge fluid is controlled to provide a given temperature to the interior of the valve body. In applications where temperature control is particularly important it will be desirable to provide additional longitudinal flow passageways in the valve body for flow of fluid between the first and second chambers. Thus as many as five or more such passageways may desirably be regularly spaced apart in the valve body.

FIG. 5 and 6 illustrate a deformable replaceable sleeve member 36 of the present invention. The sleeve body 36 is made of Teflon or polymers which are suitable for high temperature applications as for example 700° F Openings or channels 38, 40 do not extend into the interior of the sleeve member but only provide a flow path between the interior of the central opening of the valve body and the exterior of the sleeve member. In high temperature operation it has been found that Teflon or other similar material tends to deform and thus porous support means 39, 41 are positioned in the openings. Suitable support means for example comprises a Dutch weave screen. Sizes from 40 mesh wire cloth 10 thousands gage to 80 mesh wire cloth 5 thousands gage have been found suitable.

SUMMARY OF ADVANTAGES OF THE INVENTION

The present invention provides a valve having a purge system associated therewith and a valve stem having replaceable sleeves for use therewith. The purge prevents leakage of gas or liquid from the valve should a leak occur at the valve body - valve stem interface. Because of the purge system the valve may be made of easily handled materials than would be possible without the added safety afforded by the purge system. The construction of the valve allows easy replacement of the valve stem and the seals within the valve body. Further the selas can be tightened while the place within the valve body. The purge system may also serve as a heat transfer system to keep the temperature in the valve body at a desirable level. The valve stem of the present invention provides easily removable plastic sleeves for use in the valve body. The stem is removed from the valve body and the sleeves replaced when wear occurs.

Other advantages and uses of the present invention will be apparant from the above detailed description. Although certain preferred embodiments of the invention has been described in detail the invention is not limited to such embodiments but rather by the scope of the appended claims.

I claim:

1. A valve comprising a valve body having a central opening formed therein, sample flow passages in said valve body communicating with said central opening, a valve stem in said central opening of said valve body for selectively opening and closing said sample flow passages, said valve stem comprising an elongated member having a portion adapted to be received in said central opening of the valve body, a deformable sleeve member removably fitted in position over said portion of said elongated member and connected to said elongated member for rotation therewith, said sleeve member having openings therein to selectively open and close said sample flow passages communicating with the said central opening in said valve body and locking means disconnectably connecting aid sleeve member in said position over said elongated member and for changing the sealing pressure exterted by said sleeve member, first cap means cooperating with said valve stem to close off the upper end of said central opening of said valve body and forming with said valve body a first chamber adjacent said valve stem and said central opening above said sample flow passages, means forming a first purge flow passageway extending between said first chamber and the outside of said valve body for flowing purge fluid into or out of said first chamber, means defining a second chamber in said valve body adjacent said valve stem and said central opening below siad sample flow passages, means forming a second purge flow passageway extending between said second chamber and the outside of said valve body for flowing purge fluid into or out of said second chamber and means forming a connecting passageway (formed) in said valve body for flowing purge fluid between said first chamber and said second chamber.

2. The valve of claim 1 further characterized (by) in that said connecting passageway means comprises a plurality of connecting passageways formed in said valve body for flowing purge fluid between said first chamber and said second chamber.

3. The valve of claim 1 further characterized (by) in that said locking means comprises locking nut means threadedly engaged in said valve body below said second chamber.

4. The valve of claim 1 further characterized (by) in that said sample flow passages comprise at least four sample flow passages spaced apart in said valve body in a plane normal to the centerline of said valve body.

5. The valve of claim 4 further characterized (by) in that said sample flow passages comprise two longitudinally spaced apart sets of at least four sample flow passages.

6. The valve of claim 1 further characterized in that support means are positioned in the said openings of said sleeve member to prevent undesirable deformation of said sleeve member.

7. The valve of claim 6 further characterized in that the support means in the said openings of said sleeve member is porous screen.

8. The valve of claim 1 further characterized in that at least a portion of said elongated member received in said central opening of said valve body is rectangular in cross section.

9. The valve of claim 1 further characterized (in that) by collars having tapered portions engaging said deformable sleeve member are removably connected to said elongated member above and below said deformable sleeve member.

10. The valve of claim 9 further characterized (in that at least two) by a second deformable sleeve (members are) member connected to said elongate member and that a spacer collar having upper and lower tapered edges is positioned (in) on said elongated member between said deformable sleeve members.

* * * * *